Patented Jan. 11, 1938

2,105,269

UNITED STATES PATENT OFFICE 2,105,269

MOLDING POWDER AND PRODUCT

Adrian A. Robinson, Chicago, Ill., assignor to Wilson & Co., Inc., a corporation of Delaware No Drawing. Application October 17, 1935, Serial No. 45,502

1 Claim. (Cl. 106—22)

This invention relates to a molding powder and product, and more particularly to a molding powder comprising soluble blood.

Soluble animal blood has disadvantages as a molding powder, either alone or in combination with a filler, in view of the great water absorption of the resulting product, and also because of the lack of plasticity or flow in molding.

It has now been discovered that a satisfactory molding powder may be produced, and a satisfactory molded product made therefrom providing a substantial proportion of a synthetic resin is added to soluble blood.

In preparing such a product, soluble blood and a synthetic resin, such as phenol-formaldehyde, urea-formaldehyde, phenol-furfural, a glyptal resin or other synthetic resin, are mixed in such proportion that the resulting molded product will have a low water absorption, for example, not over 15% when exposed to water for twenty hours at room temperature.

The percentage of synthetic resin required will vary somewhat with the type and form of the resin. Normally, not more than thirty parts of the synthetic resin is required and not less than ten parts should be used. These figures are based on the use of twenty-five to forty-five parts of soluble animal blood.

Customary fillers such as wood flour, cotton flock, paper, alpha flock and the like may be employed, generally being from forty to sixty percent of the total molding powder.

For example, the following table shows the preferred ranges for the three constituents:

|  | Maximum | Minimum |
|---|---|---|
|  | Per cent | Per cent |
| Soluble blood | 45 | 25 |
| Synthetic resin | 30 | 10 |
| Filler | 60 | 40 |

A preferred molding powder is prepared by the use of 25% resin, 25% soluble blood and 50% filler, such as wood flour. When prepared from a powder in the above proportions, using a water-dispersible phenol-formaldehyde resin, the resulting product has a water absorption of from 8 to 10% when exposed to water for twenty hours at room temperature (about 70°), whereas a similar product of only blood and filler has a water absorption of about 40%.

In preparing the molding powder, the resin may be mixed with the filler, either in dry powdered form, or in dispersed state, for example, as an aqueous dispersion in water. Where incorporated in wet form, the product may then be dried in a suitable manner.

Likewise, the soluble blood may be mixed with the filler, either as a powder, or in a solution, preferably aqueous. In this case the solvent is removed by suitable drying, for example by exposure in thin layers to the atmosphere in a warm dry room.

The soluble blood is preferably treated with a small amount of preservative to prevent its deterioration prior to molding. Any preservative which does not interfere with the molding process may be incorporated. For example, formaldehyde is suitable in very small amounts, say one-twentieth to one-tenth percent of 40% formaldehyde.

In preparing molded objects from the molding powder, the powder is measured out in the desired form or quantities and formed under heat and pressure. It is preferred to use a pressure at least one thousand pounds per square inch at a temperature in the range of 250 to 400° F. A pressure of twenty-five hundred pounds per square inch with a temperature of 300° F. is suitable.

Under these conditions, and with the proportions shown, the molding powder flows easily and will produce well-formed molded articles. The products are very materially less water absorbent than molded articles produced from blood alone, and at the same time are tougher and less brittle than molded articles produced from the synthetic resins themselves, as well as being considerably cheaper to produce.

The foregoing detailed description has been given for clearness of understanding only, and no unnecessary limitations should be understood therefrom, but the appended claim should be construed as broadly as permissible, in view of the prior art.

What I claim as new and desire to secure by Letters Patent is:

A molded article consisting essentially of approximately 50 parts of wood flour, 25 parts of soluble animal blood, and 25 parts of a water dispersable phenol formaldehyde resin, molded under heat and pressure, and having an absorption for water of not more than fifteen percent on exposure for twenty hours at room temperature.

ADRIAN A. ROBINSON.